US011260944B2

(12) United States Patent
Clavier

(10) Patent No.: US 11,260,944 B2
(45) Date of Patent: Mar. 1, 2022

(54) DEVICE AND SYSTEM FOR DETECTING A SIGNAL FOR LOCATING AN UNDERWATER SOURCE

(71) Applicant: ECA ROBOTICS, La Garde (FR)

(72) Inventor: Vincent Clavier, Sollies-Pont (FR)

(73) Assignee: ECA ROBOTICS, La Garde (FR)

( * ) Notice: Subject to any disclaimer, the term of this patent is extended or adjusted under 35 U.S.C. 154(b) by 796 days.

(21) Appl. No.: 16/065,186

(22) PCT Filed: Dec. 21, 2016

(86) PCT No.: PCT/FR2016/053620
§ 371 (c)(1),
(2) Date: Jun. 22, 2018

(87) PCT Pub. No.: WO2017/109416
PCT Pub. Date: Jun. 29, 2017

(65) Prior Publication Data
US 2019/0002069 A1 Jan. 3, 2019

(30) Foreign Application Priority Data

Dec. 24, 2015 (FR) ........................................ 1563356

(51) Int. Cl.
*B63C 11/48* (2006.01)
*B63B 22/00* (2006.01)
(Continued)

(52) U.S. Cl.
CPC ............ *B63C 11/48* (2013.01); *B63B 22/003* (2013.01); *B63B 22/06* (2013.01); *B63B 22/20* (2013.01);
(Continued)

(58) Field of Classification Search
CPC .......... B63C 11/48; B63C 7/26; B63B 22/20; B63B 22/003; B63B 22/00; B63B 22/06;
(Continued)

(56) References Cited

U.S. PATENT DOCUMENTS

| 4,258,568 A | 3/1981 | Boetes et al. |
| 6,625,083 B2 | 9/2003 | Vandenbroucke |

(Continued)

FOREIGN PATENT DOCUMENTS

| EP | 1 217 390 A1 | 6/2002 |
| FR | 3 003 649 A1 | 9/2014 |
| WO | 01/53850 A1 | 7/2001 |

OTHER PUBLICATIONS

International Search Report, dated Mar. 23, 2017, from corresponding PCT application No. PCT/FR2016/053620.

*Primary Examiner* — Isam A Alsomiri
*Assistant Examiner* — Amie M Ndure
(74) *Attorney, Agent, or Firm* — Nixon & Vanderhye

(57) ABSTRACT

A device (10) for detecting a signal of interest in order to locate an underwater source of the signal. The device includes a receiver (13) configured to detect the signal of interest, an actuator (14) configured to allow at least a portion of the detection device (10) to move towards a zone indicating a result of detection of the signal of interest in response to the receiver being operated, and an emitter (15) configured to indicate the result of detection of the signal of interest.

17 Claims, 6 Drawing Sheets

(51) Int. Cl.
  *B63B 22/06* (2006.01)
  *B63B 22/20* (2006.01)
  *B63C 7/26* (2006.01)
  *G01S 5/18* (2006.01)
  *G01S 5/00* (2006.01)
  *G01S 5/26* (2006.01)
(52) U.S. Cl.
  CPC .............. *B63C 7/26* (2013.01); *G01S 5/0081* (2013.01); *G01S 5/183* (2013.01); *G01S 5/26* (2013.01)
(58) Field of Classification Search
  CPC ... G01S 5/183; G01S 5/26; G01S 5/00; G01S 5/0081; G06F 1/1643; G06F 1/1626; G06F 1/1635; G06F 1/1677; G06F 2200/1634; G06F 2200/1614; G09B 5/02; Y10S 345/901
  See application file for complete search history.

(56) References Cited

U.S. PATENT DOCUMENTS

| | | | |
|---|---|---|---|
| 2002/0083880 A1* | 7/2002 | Shelton | B63G 8/001 114/312 |
| 2002/0153419 A1* | 10/2002 | Hall | G06F 1/1684 235/400 |
| 2004/0029593 A1* | 2/2004 | Skinner | B82Y 10/00 455/456.1 |
| 2010/0107959 A1* | 5/2010 | Israel | H04B 13/02 114/312 |
| 2016/0320484 A1* | 11/2016 | Lanham | F41J 9/06 |

* cited by examiner

DEVICE AND SYSTEM FOR DETECTING A SIGNAL FOR LOCATING AN UNDERWATER SOURCE

The present invention relates to devices and systems for detecting a signal of interest, to make it possible to locate an underwater source of this signal.

An Underwater Locator Beacon (ULB) is a pinger fixed to a flight recorder (also known as a "black box") or to the fuselage of an aircraft. The beacons are activated in the event of immersion and designed to emit an ultrasonic pulse at a given frequency, generally 37.5 kHz. They could also emit on other frequencies, for example between 8 kHz and 10 kHz. The pulses are emitted at one-second intervals for at least thirty days (the life of the energy sources) so that they can be traced. Typically this is carried out using a hydrophone, i.e. an electroacoustic transducer that transforms acoustic waves in a liquid into electrical signals, towed by a vessel.

FIG. 1 shows a conventional system 1 for searching for and locating pingers. The system 1 comprises a vessel 2 and a towed hydrophone 3 (Towed Pinger Locator) in order to detect and locate a beacon 4 lying on a sea bed 5. The hydrophone 3 makes it possible, for example, to detect an acoustic signal up to a distance D of approximately 20,000 feet.

Generally, the vessel 2 covers a zone that is predetermined by laying out a grid with slow towing of the hydrophone 3 (typically between 1 and 5 nautical miles per hour).

If the accident site of an aircraft the beacon of which is being searched for is uncertain, several vessels must be used in order to detect the beacon 4 while it is emitting a signal, at significant financial and human cost. In addition, the search is limited by the meteorological conditions and physical constraints (reprovisioning, etc.). It cannot therefore be ruled out that the beacon 4 will stop emitting a signal before it is found.

In some cases, autonomous means (i.e. that are not towed) can be used to supplement and/or replace a conventional system. It is thus possible to use, for example, military submarines, Autonomous Underwater Vehicles (AUV) or Remotely Operated Vehicles (ROV). This can be linked, for example, to difficult meteorological conditions. However, the use of such means presents other drawbacks such as, for example, considerable repositioning time, limited battery life and significant recharging time, the availability of experienced operators, or the unavailability of these means due to other demands.

It thus appears that the current means are based on systematic sweeping of a search zone and are unsuitable for detecting and locating an underwater locator beacon in a wide search zone, within a limited period of a few weeks and in uncertain conditions.

The invention makes it possible to overcome at least one of the drawbacks set out above.

Embodiments of the invention relate to a device for detecting a signal of interest allowing an underwater source of the signal to be located, the device comprising:
  a receiver configured to detect the signal of interest,
  an actuator configured to allow at least one part of the detection device to move to a zone for signalling a result of detection of the signal of interest in response to a prompt from the receiver, and
  an emitter configured for signalling the result of detection of the signal of interest.

The device can be distributed, in large numbers, quickly and easily, in a wide search zone so that a signal of interest, for example from an underwater locator beacon, can be detected by the receiver, which controls the actuator, which then makes at least the emitter ascend to signal the detection result. These devices operate independently of each other to detect the source of the signal.

In an embodiment, the receiver is a hydrophone and the signal of interest is an acoustic signal with a predetermined frequency.

The device is then configured to detect a predetermined signal and not just any signal.

In an embodiment, the device also comprises ballast configured to make the detection device descend to the sea bed and the actuator therein is a means for detaching the ballast in order to allow said at least a part of the detection device to ascend to the surface.

The detection device then comprises low-cost "passive" means of descent and ascent.

In an embodiment, the emitter is protected by the ballast.

In an embodiment, the emitter is a radio emitter configured to emit a radio signal.

The radio signal can be detected remotely by a satellite for example, or an antenna mounted on a vessel.

In an embodiment, the emitter is configured to emit the detection result according to at least one of the following conditions:
  after the detection of the signal of interest,
  after the actuation of the actuator,
  when said at least one part of the detection device is in the signalling zone,
  after a predetermined period, and
  when said at least one part of the detection device is close to the surface of the water.

The emitter can then be configured according to the needs and constraints of the search.

In an embodiment, the shape of said at least one part of the detection device is designed to allow the ascent of said at least one part of the detection device due to the buoyancy effect.

In an embodiment, the actuator is configured to activate a propulsion means.

The device can then ascend and/or descend by means of the propulsion means.

Embodiments of the invention also relate to a method for detecting a signal of interest originating from an underwater source and signalling the detection result, allowing the source to be located, the method being implemented by a device according to an embodiment.

In an embodiment, the method comprises the steps of:
  receiving a result of detection of the signal from the receiver,
  controlling the actuator to allow said at least one part of the detection device to move to a zone for signalling the result of detection of the signal of interest, and
  signalling, by means of the emitter, the result of detection of the signal of interest.

In an embodiment, the method also comprises a step of detaching a ballast from said at least one part of the detection device, allowing at least the emitter to move to the signalling zone.

In an embodiment, the movement of said at least one part of the detection device is carried out in response to the detection of the signal of interest.

In this case, only positive detection results are signalled, in order to avoid an information overload and allow faster location of the source of the signal.

Embodiments of the invention also relate to a system for distributing several detection devices according to an embodiment. The system comprises a distribution vehicle and a distributor of detection devices, comprising a plurality of detection devices.

Such a system allows rapid distribution of the detection devices in a wide search zone.

In an embodiment, the distributor is configured to distribute the detection devices according to a predetermined topology.

In an embodiment, the system also comprises a means for detecting a detection result originating from a detection device.

Embodiments of the invention also relate to a method for distributing several detection devices according to an embodiment and for detecting a detection result originating from a detection device making it possible to locate the source of the signal of interest. The distribution and detection method comprises the implementation of a system according to an embodiment and comprises the steps of:

distributing the detection devices in a search zone according to a predetermined topology, and detecting at least one positive result of detection of the signal.

In an embodiment, the method also comprises a step of determining the predetermined distribution topology of the detection devices, and the distributor is configured to distribute the detection devices according to the predetermined topology.

Further advantages, aims and features of the present invention will become apparent from the following detailed description, given by way of non-limitative example, with reference to the attached drawings, in which:

FIG. 1 is a diagrammatic representation of a conventional system for searching for a signal originating from an underwater source;

FIG. 2, comprising FIGS. 2A, 2B, 2C, shows a detection device according to an embodiment in different detection and location states;

Generally, the purpose of the invention is to allow rapid distribution of detectors of a signal of interest in a wide search zone so that an acoustic source situated at each point of the zone can be detected by a detector. These detectors operate independently of each other to detect a signal and transmit a result of detection of the signal. Each detector thus contributes to locating a source of the signal. When one or more detectors have detected the presence of a source of the signal, a more accurate search can be carried out in a zone restricted to that situated close to those detectors.

Figure 1:
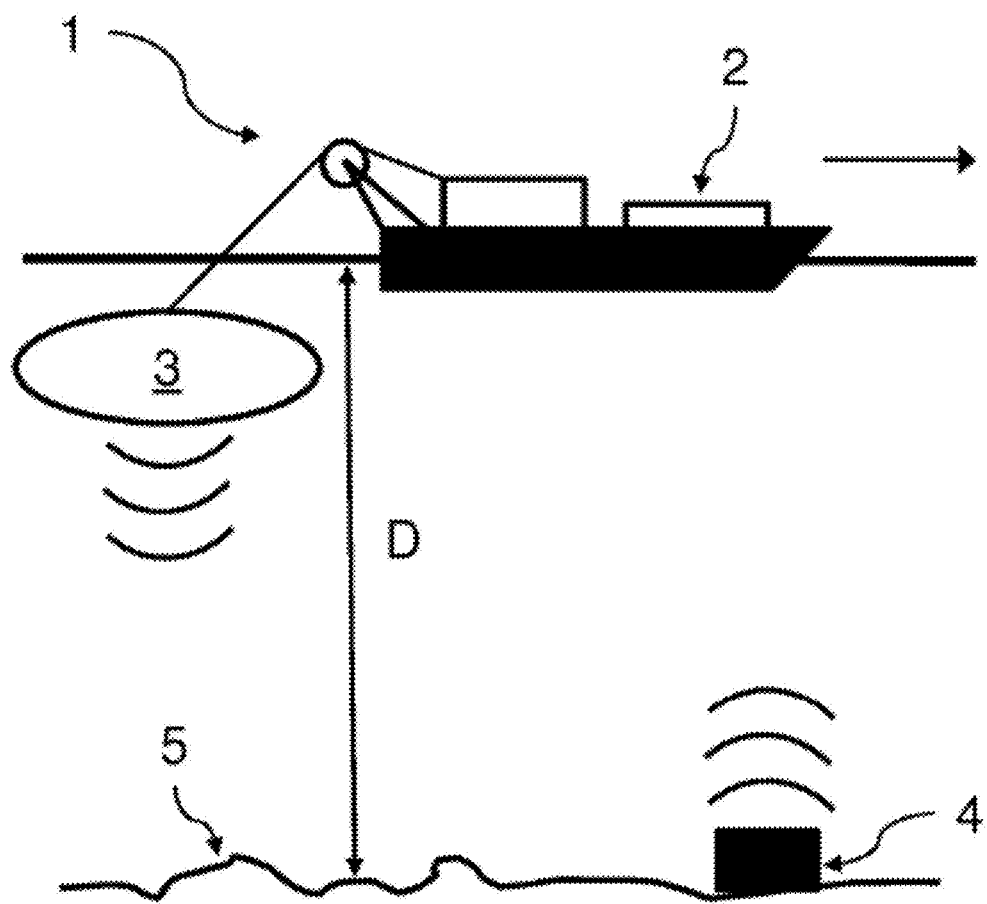
Figure 2C:
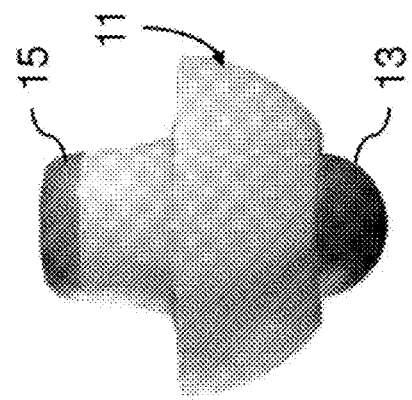
Figure 2B:
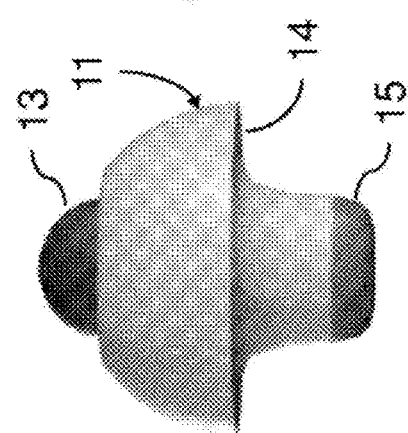
Figure 2A:
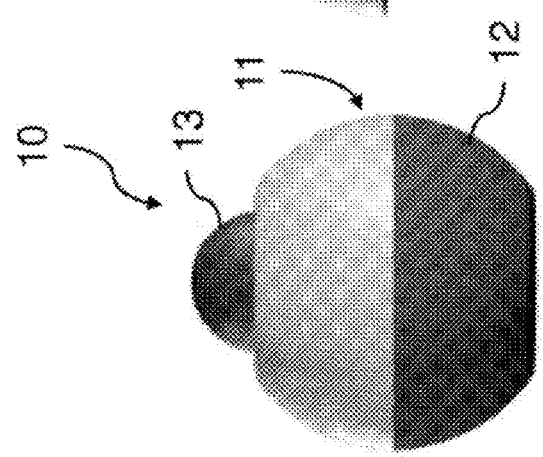

FIG. 2, comprising FIGS. 2A, 2B, 2C, shows a detection device 10 (or detector) according to an embodiment in a state of detecting the signal, a state following the detection of the signal and a state of emitting a result signal, respectively.

According to the embodiment shown, the detection device 10 comprises an "active" part 11 and an "inactive" part or ballast 12. Here, the active part 11 comprises a receiver 13 of a signal of interest, an actuator 14 and an emitter 15 of a detection result. The detection device 10 also comprises a control unit and an energy source, not shown in FIG. 2. It will be noted that the receiver 13 and the actuator 14 could, in particular, be implemented in the ballast 12.

The detection device 10, or more generally a plurality of detection devices such as the detection device 10, are distributed in a search zone by appropriate means (helicopter, ship, etc.) that are described in more detail with reference to FIG. 6.

When a detection device is distributed, typically released from a craft, the ballast 12 forces the detection device 10 to descend to the sea bed.

The receiver 13 is for example a hydrophone configured to detect an acoustic signal emitted by a beacon at a specific frequency. The configuration can be predetermined (for example during the production or on the sale of the detection device) or determined subsequently, for example in view of its use, depending on the source of interest.

The actuator 14 allows the ballast 12 to be detached from the detection device 10 in order to allow the active part 11 to ascend to the surface. The zone to which the active part 11 ascends is the zone in which the detection device 10 was released, modified depending on the marine currents and other factors that have influenced the descent and/or ascent of the detection device 10 or the active part 11 thereof, respectively. Here, the zone to which the active part 11 ascends is called the signalling zone.

The emitter 15 then emits a result signal that can be detected.

The result signal can be a simple visual signal, for example a flare, or an electromagnetic signal then comprising, preferably, an item of information according to which the signal has been detected and an item of identification data of the device 10 the active part of which is emitting. Alternatively or additionally, these data can comprise location data.

The conditions of detection of a signal of interest, actuation of the actuator and emission of the result signal can vary in particular depending on the conditions of the search zone, the time available, equipment and meteorological constraints, analysis requirements and required reliability levels.

By way of illustration, the receiver 13 can be activated when the detection device 10 is released in order to start detecting a signal of interest as soon as the detection device 10 descends, when the latter is immobile (i.e. when it has reached the sea bed), or after a predetermined period after it has been released or has reached the sea bed.

Similarly, the actuator 14 can be actuated and cause the active part 11 of the detection device 10 to ascend only if the detection result is positive (the predetermined signal has actually been detected) or after a certain time, for example regardless of the detection result.

The actuator 14 can be a simple electromagnet that releases the ballast 12, an electromagnetic bolt or any other means allowing the active part 11 to be separated from the ballast 12. The active part 11 of the location device 10 can ascend to the surface by simple buoyancy effect.

According to a particular embodiment, the active part 11 turns over after it has been separated from the ballast 12, due for example to the shape thereof and the mass distribution in the active part 11. Still according to a particular embodiment, the emitter 15 is housed in a recess in the ballast 12 so that it is protected and is situated towards the top when the active part 11 is separated from the ballast 12, which facilitates the emission of a result signal.

It will be noted here that the emission of a result signal by the emitter 15 can be carried out immediately after the detection of a signal of interest by the receiver 13, after actuation of the actuator 14, after a predetermined time following the detection of a signal of interest or the actuation of the actuator 14, or when an emission zone is reached (for example, approximately one hundred meters below the surface or the surface itself).

In a particular embodiment, the detection device 10 is configured so that the active part 11 only ascends to the surface if the signal of interest has actually been detected, in order to simplify the processing of location data.

According to another embodiment, the detection device 10 is configured so that the active part 11 ascends to the surface even if the signal of interest has not been detected, in order to emit a signal that indicates the absence of detection of the signal of interest in the zone in question. Such an embodiment makes it possible to check that the system is working correctly, and thus eliminate zones from the search for a signal of interest, for example by being certain that a location device that has detected a signal of interest has not been trapped and is then incapable of ascending to the surface and emitting a result signal.

The detection device 10 must be immersion resistant, and its resistance must be determined depending on the topography of the places where searches must be carried out. According to embodiments, the detection device 10 is resistant to deep sea immersion. It is also capable of descending to the sea bed by gravity or by propulsion, ascending to the surface by buoyancy or by propulsion and emitting a signal for a sufficient period, for example for several hours, several days or several weeks.

When the receiver 13 of the detection device 10 is a hydrophone, it must be sensitive to the frequency of interest, for example 33.5 kHz for the current underwater locator beacons. It can also be configured or configurable to allow the detection of future frequencies, particularly frequencies being investigated such as 8.8 kHz and 9.5 kHz, which can generally be detected by a 10 kHz hydrophone. It sensitivity also makes it possible, preferably, to carry out detections at sufficient distances to allow efficient distribution of the detection devices, for example detection within a radius of 1.2 nautical miles for a frequency of 33.5 kHz and 5 nautical miles for a frequency of 8.8 kHz.

Advantageously, the detection devices are relatively inexpensive with respect to the other known means (such as deploying a towed hydrophone, a military submarine, autonomous underwater robots or remotely operated underwater vehicles) and can be seen as "consumables" that are not recovered in the search for a beacon, particularly for wide, very deep search zones. In addition, they can be deployed relatively quickly (they must simply be released according to mapping making it possible cover an identified zone) and in poor meteorological conditions.

In some cases, for example in "test" (testing the satisfactory operation of the system) or "training" (for handling the detection devices) modes, the active parts 11, or even the ballast 12, can be recovered. Specific versions of the detection devices can also exist for training, configured to facilitate the recovery thereof.

Figure 3:
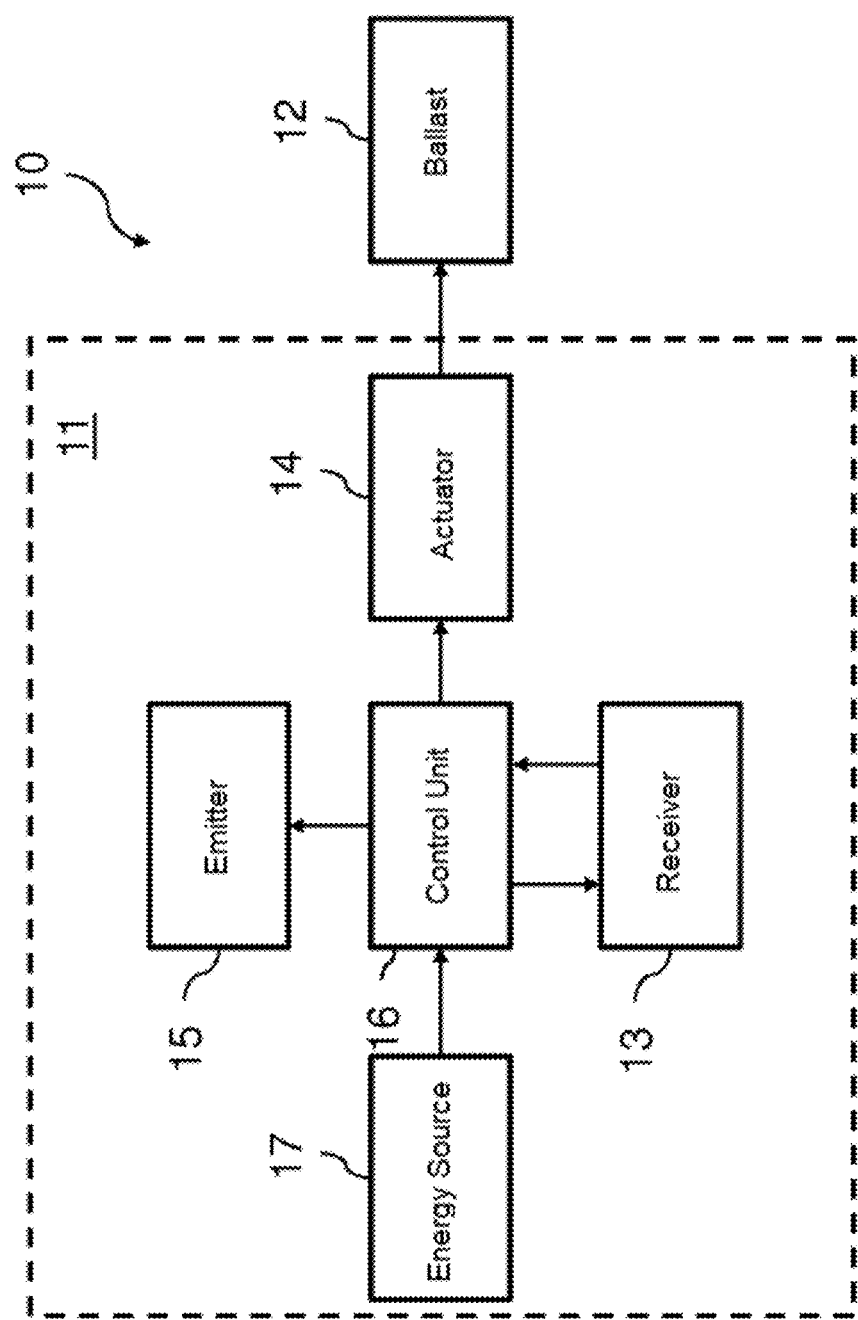
FIG. 3 is a diagrammatic representation of the functional structure of a detection device according to an embodiment.

FIG. 3 is a diagrammatic representation of the functional architecture of the detection device 10, with its active part 11 and the ballast 12.

As shown, the active part 11 here comprises the receiver 13, the actuator 14, the emitter 15, the control unit 16 and an energy source 17.

The energy source 17 here supplies an electric current to the control unit 16. The control unit controls in particular the receiver 13, the emitter 15 and the actuator 14. Alternatively, the energy source 17 can supply an electric current directly to the receiver 13, to the actuator 14 and to the emitter 15.

When the receiver 13 must be used, it is activated by the control unit 16, which supplies it with the necessary electric current. The receiver 13 transmits the signals received to the control unit 16 so that the latter can determine whether a signal of interest has been received. To this end, the control unit comprises standard circuits, for example amplification and filtering circuits to process the signals received and a comparison circuit for comparing a signal received (amplified and filtered) with a signal of interest.

After a predetermined time and/or when a signal of interest is detected, the control unit 16 actuates the actuator 14 and activates the emitter 15 (and, if applicable, supplies them with the necessary electric current) in order to allow the active part 11 to ascend to the surface and emit a result signal.

Figure 4:
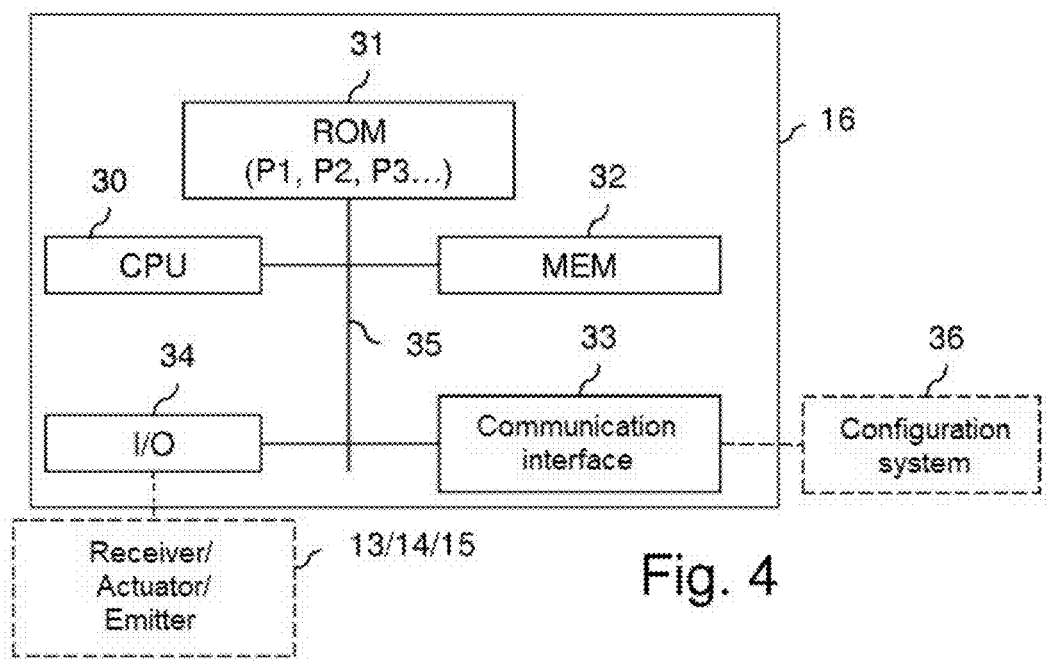
FIG. 4 is a diagrammatic representation of an example of the structure of the control unit of the device shown in FIG. 3.

FIG. 4 is a diagrammatic representation of an example of the structure of the control unit 16, which here comprises a central processing unit 30 (CPU), a Read Only Memory 31 (ROM), a Random Access Memory 32 (RAM), a communication interface 33 and an Input/Output interface 34 (I/O), all interconnected by a bus 35.

The ROM 31 stores one or more programs (P1, P2, P3, etc.) allowing the detection device 10 to implement the method. The communication interface 33 communicates with a configuration system 36 that allows the configuration of the processing unit 16, for example when the detection device 10 is produced or before it is deployed. The input/output 34 allows communication with the receiver 13, the actuator 14 and the emitter 15.

Figure 5:
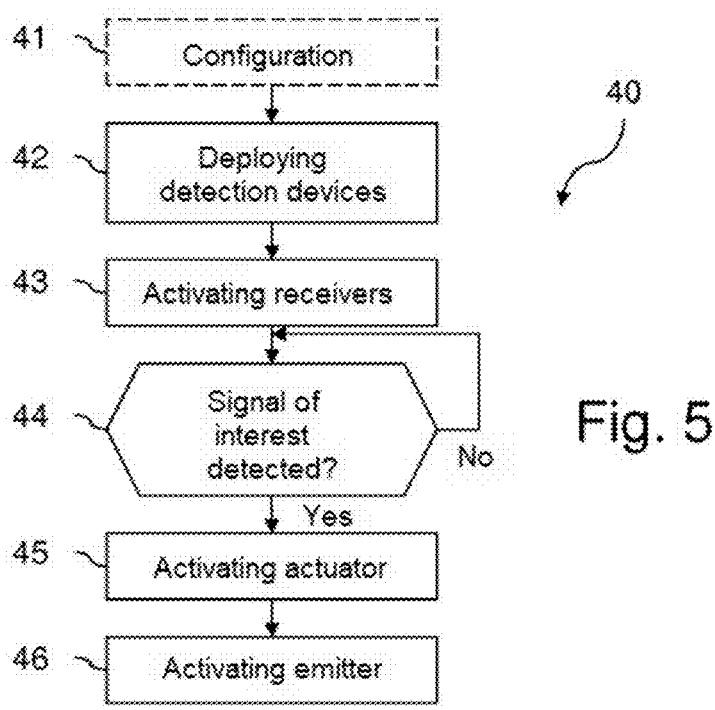
FIG. 5 is a flow chart of certain steps of a method for detecting a signal of interest originating from an underwater source and signalling the detection result making it possible to locate the source.

FIG. 5 is a flow chart of certain steps of a method 40 for detecting a signal of interest originating from an underwater source and signalling the detection result in order to allow the source to be located.

The method 40 comprises steps 41 to 46. Steps 41 to 43 relate to a set of detection devices and steps 44 to 46 are implemented in each detection device.

In step 41, the detection devices are configured according to various parameters such as the search requirements—the signal of interest, the period before detection and/or emission.

In step 42, the devices are deployed, as will be described in more detail with reference to FIGS. 6 and 7. In step 43, the receivers (13) of each detection device are activated.

In step 44, it is determined, in each detection device, whether the signal of interest has been detected. In a particular embodiment, if the response is negative, the method loops continuously until there is a positive response (or until it is stopped). If the response is positive, the method advances to step 45, in which the actuator 14 is actuated, allowing the detection device, or at least one part thereof, to ascend to the surface. In step 46, the emitter 16 is actuated, allowing a detection result signal to be emitted.

It must be understood that there are numerous alternatives to the method described herein. They can in particular relate to actuating the actuator after a predetermined period, without waiting for a positive detection result.

Figure 6:
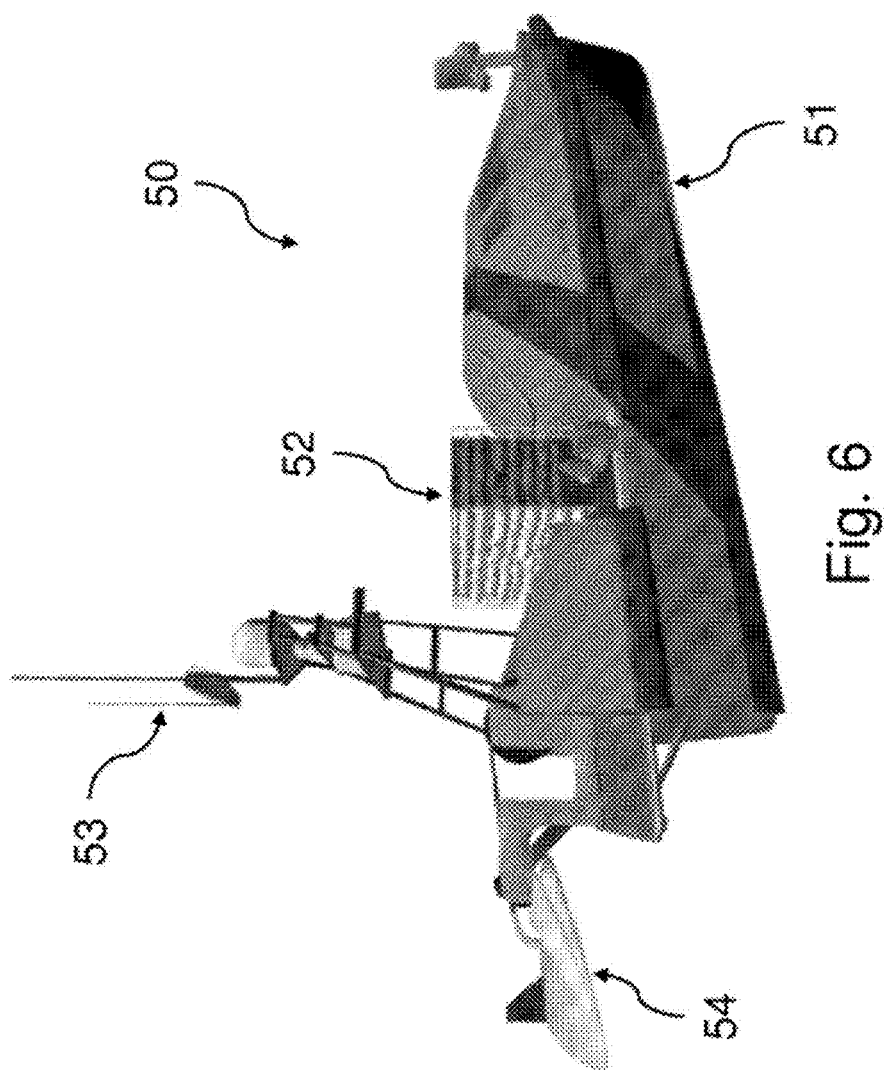
FIG. 6 shows an example of a system for distributing detection devices according to an embodiment.

FIG. 6 shows a system 20 for distributing detection devices such as the detection device 10 according to a particular embodiment.

As shown, the system 20 comprises a vessel 21 and a distributor 22 containing a plurality of detection devices (here similar to the detection device 10). Optionally, the system 20 also comprises an antenna 23 for detecting a result signal and/or a towed hydrophone 24 for searching in a shallow zone and possibly a restricted zone following the detection of a positive result by one or more detection devices.

The vessel 21 can be a manned or unmanned vessel (Unmanned Surface Vehicle, or USV), allowing distribution over a wide area. The distributor 22 allows a timing reference using, for example, a Global Positioning System (GPS) and a mission planning interface to take into account parameters such as the number of vessels deployed, the surface and the nature of the search zone and the results sent by the detection devices.

A command ship acting as an operations centre comprising means for reprovisioning the vessels 21 with detection devices and allowing in particular the planning of the search zones and the processing of the data obtained from the detection devices can be located in the vicinity.

In an embodiment, the detection devices are distributed manually by an operator from a vehicle (for example a boat, a helicopter or a submarine) with regular timing depending on the speed of the vehicle, for example every five minutes, in order to lay out a grid of the search zone.

The detection device(s) that has/have ascended to the surface transmit(s) detection and location information using, for example, the services of satellite communication service providers, to a search coordination centre.

Figure 7:
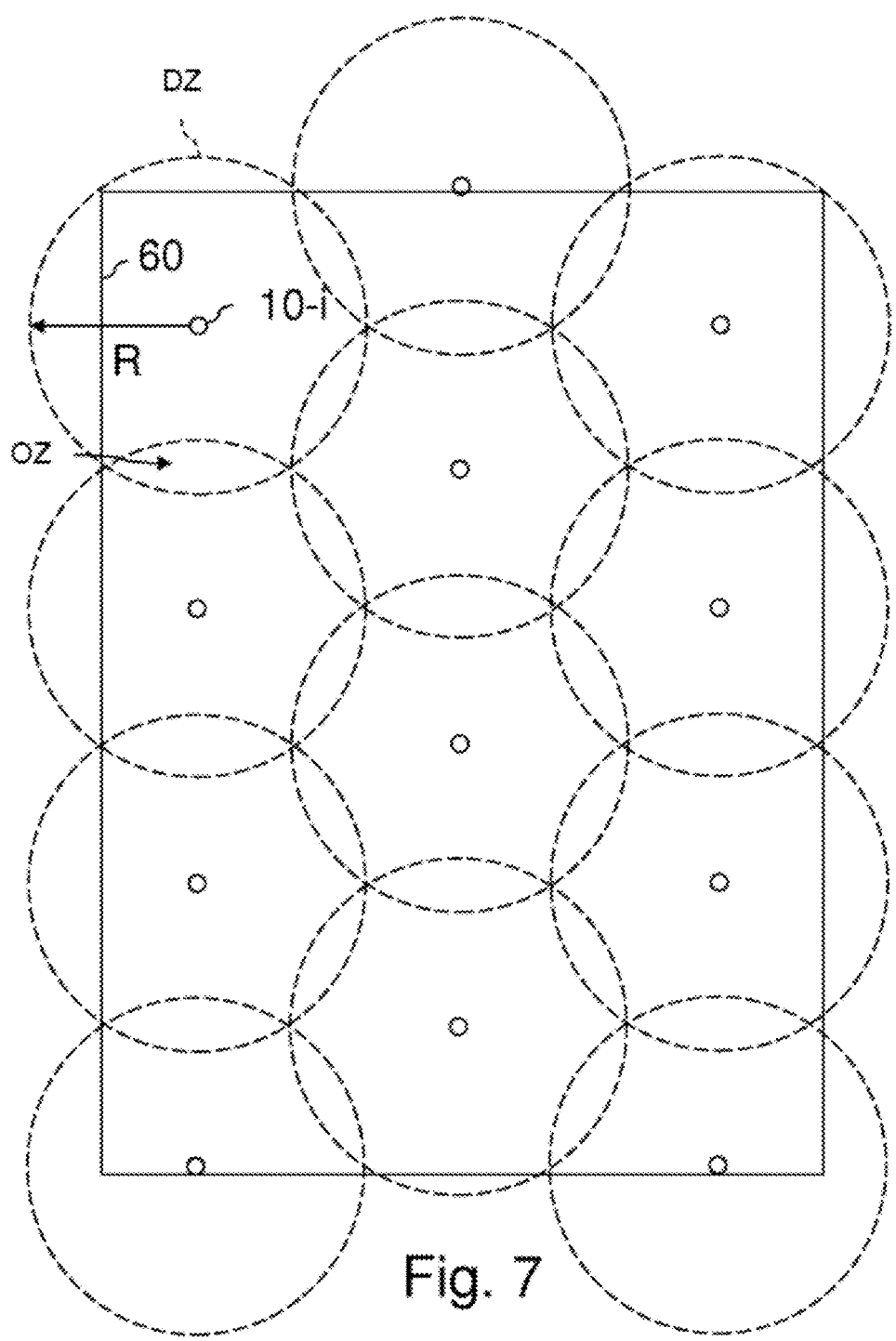
FIG. 7 shows a search zone after detection devices according to an embodiment have been deployed.

FIG. 7 shows a search zone 60 after detection devices such as the detection device 10 have been deployed. This is a theoretical representation in that the detection devices are subject to constraints such as currents, and it can be difficult to launch these detection devices while predicting how they will drift during their descent.

As shown, a number N of detection devices with reference sign 10-$i$ (where i is an integer from 1 to N), similar to the detection device 10, are deployed in the search zone 60. Each detection device 10-$i$ has a detection radius R determined according to the features and configuration thereof, forming a surrounding detection zone DZ. Overlap zones OZ between at least two detection zones DZ can occur, particularly as a function of the number of detection devices available, the desired reliability rate and drifting between the points of deployment of the devices and the points where they come to rest on the sea bed.

Here, it will be noted that the detection radius R can vary from one detection device to another.

For example, the search mapping may stipulate that each point of the search zone be covered by at least two detection devices to prevent false negative responses if a detection device does not operate correctly or if a point is not covered by a detection device due to drifting linked, for example, to the current.

Other embodiments and implementations of the device and system according to the invention can be envisaged.

In particular, the device can be configured to detect and signal a non-acoustic "signal", for example a chemical, radiation, a passing submarine or boat. More generally, all sorts of predetermined "signals", "data" or "events" can be detected and signalled.

In particular embodiments, the devices are distributed before the occurrence of an event or before a source to be detected is present, for example around a perimeter to be protected, and remain on standby until a signal, an item of data or an event is detected (or until the batteries run out).

By way of illustration, such devices can be distributed at sea to detect the presence of currents with certain predetermined features (temperatures, pollution, etc.).

In an embodiment, devices with different sensitivities for detection of the signal of interest are deployed. For example, initially, devices with a sensitivity of ten nautical miles are distributed over a very wide zone. After initial detection of the signal of interest, devices with a sensitivity of one nautical mile are distributed in a more restricted zone determined on the basis of the results obtained using the first detection devices. This process can be repeated with other levels of sensitivity.

In an embodiment, the detection device 10 initializes detection by the receiver 13 as soon as it is deployed, without waiting until it is immobile. In this case, if the signal is detected during the descent to the sea bed, the ballast 12 can be released immediately to allow the detection device 10 to ascend and emit a result signal. The signal of interest will then be detected more quickly and there will be less risk of the detection device being trapped underwater, which would prevent signalling of the detected signal (creating a "false negative response"), or drifting.

In an embodiment, the detection devices are stored in or with an underwater locator beacon or in the fuselage of an aircraft, before any accident. They could then ascend to the surface of the water once released. For this, they would have to be impact resistant.

A person skilled in the art will understand that the device and system described are not only applicable to searching for an acoustic signal, in particular from a beacon transmitter. On the contrary, all types of signal of interest can be detected and signalled, for example, detected radiation or the presence of a chemical compound.

Naturally, to meet specific needs, a person skilled in art could make changes to the above description. The present invention is not limited to the embodiments described; other variants and combinations of features are possible.

The present invention has been described and illustrated in this detailed description with reference to the attached figures. However, the present invention is not limited to the embodiments shown. Other variants and embodiments may be deduced and implemented by a person skilled in the field of the invention on reading the present description and the attached figures.

In the claims, the terms "comprise" or "include" do not exclude other elements or other steps. The definite article "a" does not exclude the plural. A single processor or several other units may be used to implement the invention. The various features presented and/or claimed can advantageously be combined. Their presence in the description or in various dependent claims does not in fact exclude the possibility of combining them. The reference signs cannot be understood as limiting the scope of the invention.

The invention claimed is:

1. A detection device for detecting an acoustic signal of interest having a predetermined frequency, making it possible to locate an underwater source of the acoustic signal, the detection device comprising:
   a receiver configured to detect the acoustic signal of interest,
   an actuator configured to allow at least one part of the detection device to move to a zone for signalling a result of detection of the acoustic signal of interest in response to detecting the acoustic signal of interest, and
   an emitter configured within the at least one part of the detection device for signalling the result of detection of the acoustic signal of interest.

2. The detection device according to claim 1, further comprising ballast configured to make the detection device descend to the sea bed and in which the actuator is a means for detaching the ballast in order to allow said at least one part of the detection device to ascend to the surface.

3. The detection device according to claim 2, wherein the ballast comprises a recess configured for receiving and protecting the emitter when the ballast is attached to the at least one part of the detection device.

4. The detection device according to claim 1, wherein the emitter is a radio emitter configured to emit a radio signal.

5. The detection device according to claim 1, wherein the emitter is configured to emit the detection result according to at least one of the following conditions:
- after the detection of the acoustic signal of interest,
- after the actuation of the actuator,
- when said at least one part of the detection device is in the signalling zone,
- after a predetermined period, and
- when said at least one part of the detection device is close to the surface of the water.

6. A method for detecting an acoustic signal of interest originating from an underwater source and signalling a detection result making it possible to locate the source, the method being implemented by each detection device of a set of detection devices according to claim 5, and comprising the steps of:
- receiving a result of detection of the acoustic signal from the receiver,
- in response of receiving a result of detection of the acoustic signal of interest by the receiver, controlling the actuator to allow said at least one part of the detection device to move to a zone for signalling the result of detection of the acoustic signal of interest, and
- signalling, by means of the emitter, of the result of detection of the acoustic signal of interest.

7. The detection device according to claim 1, wherein the shape of said at least one part of the detection device is designed to allow said at least one part of the detection device to ascend due to the buoyancy effect.

8. A method for detecting an acoustic signal of interest originating from an underwater source and signalling a detection result making it possible to locate the source, the method being implemented by each detection device of a set of detection devices according to claim 7, and comprising the steps of:
- receiving a result of detection of the acoustic signal from the receiver,
- in response of receiving a result of detection of the acoustic signal of interest by the receiver, controlling the actuator to allow said at least one part of the detection device to move to a zone for signalling the result of detection of the acoustic signal of interest, and
- signalling, by means of the emitter, of the result of detection of the acoustic signal of interest.

9. The detection device according to claim 1, wherein the actuator is configured to activate a propulsion means.

10. A method for detecting an acoustic signal of interest originating from an underwater source and signalling a detection result making it possible to locate the source, the method being implemented by each detection device of a set of detection devices according to claim 9, and comprising the steps of:
- receiving a result of detection of the acoustic signal from the receiver,
- in response of receiving a result of detection of the acoustic signal of interest by the receiver, controlling the actuator to allow said at least one part of the detection device to move to a zone for signalling the result of detection of the acoustic signal of interest, and
- signalling, by means of the emitter, of the result of detection of the acoustic signal of interest.

11. A method for detecting an acoustic signal of interest originating from an underwater source and signalling a detection result making it possible to locate the source, the method being implemented by each detection device of a set of detection devices according to claim 1, and comprising the steps of:
- receiving a result of detection of the acoustic signal from the receiver,
- in response of receiving a result of detection of the acoustic signal of interest by the receiver, controlling the actuator to allow said at least one part of the detection device to move to a zone for signalling the result of detection of the acoustic signal of interest, and
- signalling, by means of the emitter, of the result of detection of the acoustic signal of interest.

12. The method according to claim 11, further comprising a step of detaching ballast from said at least one part of the detection device, allowing the at least one emitter to move to the signalling zone.

13. A system for distributing several detection devices according to claim 1, comprising:
- a distribution vehicle, and
- a distributor of detection devices, comprising a plurality of detection devices.

14. The system according to claim 13, wherein the distributor is configured to distribute the detection devices according to a predetermined topology.

15. The system according to claim 13, further comprising means for detecting a detection result originating from a detection device.

16. A method for distributing several detection devices according to claim 1, detecting a detection result originating from a detection device making it possible to locate the source of the acoustic signal of interest, the method comprising the implementation of a system for distributing several of the detection devices, the system comprising a distribution vehicle, and a distributor of detection devices, comprising a plurality of detection devices, the method comprising the steps of:
- distributing the detection devices in a search zone according to a predetermined topology, and
- detecting at least one positive result of detection of the acoustic signal.

17. The method according to claim 16, also comprising a step of determining a distribution topology of the detection devices, the distributor being configured to distribute the detection devices according to the predetermined topology.

* * * * *